United States Patent
Jacobson et al.

(10) Patent No.: US 9,997,997 B2
(45) Date of Patent: Jun. 12, 2018

(54) POWER SYSTEM BASED ON CURRENT SOURCE

(71) Applicant: Raytheon Company, Waltham, MA (US)

(72) Inventors: Boris S. Jacobson, Westford, MA (US); John C. Cochran, Portsmouth, RI (US); Jason D. Adams, Milford, MA (US); Mark S. Langelier, Harrisville, RI (US)

(73) Assignee: Raytheon Company, Waltham, MA (US)

( * ) Notice: Subject to any disclaimer, the term of this patent is extended or adjusted under 35 U.S.C. 154(b) by 734 days.

(21) Appl. No.: 14/579,921

(22) Filed: Dec. 22, 2014

(65) Prior Publication Data

US 2016/0181802 A1    Jun. 23, 2016

(51) Int. Cl.

| | |
|---|---|
| *H02J 1/00* | (2006.01) |
| *H02J 3/00* | (2006.01) |
| *H02M 3/02* | (2006.01) |
| *H02M 1/08* | (2006.01) |
| *H02M 7/02* | (2006.01) |
| *H02M 7/42* | (2006.01) |
| *H02J 1/04* | (2006.01) |

(Continued)

(52) U.S. Cl.
CPC .............. *H02M 3/02* (2013.01); *H02J 1/04* (2013.01); *H02J 1/08* (2013.01); *H02M 7/02* (2013.01); *H02M 7/42* (2013.01); *H02M 2001/008* (2013.01); *H02M 2001/0087* (2013.01)

(58) Field of Classification Search
CPC ............ H02M 3/02; H02M 1/04; H02M 1/08; H02M 7/02; H02M 7/42; H02M 2001/008; H02M 2001/0087

USPC .......................................................... 307/11
See application file for complete search history.

(56) References Cited

U.S. PATENT DOCUMENTS

| | | | |
|---|---|---|---|
| 6,835,291 | B2 | 12/2004 | Hudson |
| 7,992,632 | B2 | 8/2011 | Bornes et al. |
| 2013/0202285 | A1 | 8/2013 | Lecroart et al. |

OTHER PUBLICATIONS

Chan, et al.; Fault Location for the Neptune Power System; IEEE Transactions on Power Systems; vol. 22, No. 2, May 2007; pp. 522-531.

(Continued)

*Primary Examiner* — Hal Kaplan

(57) ABSTRACT

A regulated current-fed power system employs power branching units connected in series. Each power branching unit includes a plurality of parallel-redundant converter groups connected in series with each other within a current path for the regulated current. Each parallel-redundant converter group includes at least two direct current (DC)/DC converters connected in parallel with each other, each sharing the power load. A protection device connected in series with each DC/DC converter disconnects the respective DC/DC converter from the regulated current when the respective DC/DC converter short circuits, with the remaining DC/DC converter(s) then receiving more of the power load. An active clamp connected in parallel with all of the DC/DC converters within a parallel-redundant converter group temporarily sinks a portion of the regulated current when one of the DC/DC converters fails in a short-circuit condition. The active clamp shunts the regulated current around all DC/DC converters within the parallel-redundant converter group converters fail in a short-circuit condition.

20 Claims, 11 Drawing Sheets

(51) Int. Cl.
*H02J 1/08* (2006.01)
*H02M 1/00* (2006.01)

(56) References Cited

OTHER PUBLICATIONS

El Forjani, et al.; Detectin of Fault Location, Monitoring and Control in Underwater Power System; IEEE Engineering Conference (UPEC); 2013; 6 pp.
Jiang, et al.; "Technological Study on Distributed Fiber Sensor Monitoring of High Voltage Power Cable in Seafloor"; IEEE International Conference; Aug. 2009; pp. 1154-1157.

POWER SYSTEM BASED ON CURRENT SOURCE

TECHNICAL FIELD

The present disclosure is directed in general to supplying power to large numbers of loads dispersed over a large distance, and, more particularly, to current source power systems employed to supply power to such load configurations.

BACKGROUND OF THE DISCLOSURE

Land-based power systems often feature multiple loads connected in parallel to the source. With such configurations, a failed load may be simply disconnected from the source without causing any disruption to the rest of the system. Underwater systems, on the other hand, typically use series connections of the feeding cable and loads in systems that may extend to thousands of miles and comprise a large number of loads. As a result, any load failure that interrupts the current in the cable disables the whole underwater system.

There is, therefore, a need in the art for improved current source power systems.

SUMMARY OF THE DISCLOSURE

A regulated current-fed power system employs power branching units connected in series. Each power branching unit includes a plurality of parallel-redundant converter groups connected in series with each other within a current path for the regulated current. Each parallel-redundant converter group includes at least two direct current (DC)/DC converters connected in parallel with each other, each sharing the power load. A protection device connected in series with each DC/DC converter disconnects the respective DC/DC converter from the regulated current when the respective DC/DC converter short circuits, with the remaining DC/DC converter(s) then receiving more of the power load. An active clamp connected in parallel with all of the DC/DC converters within a parallel-redundant converter group temporarily sinks a portion of the regulated current when one of the DC/DC converters fails in a short-circuit condition. The active clamp shunts the regulated current around all DC/DC converters within the parallel-redundant converter group converters fail in a short-circuit condition.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
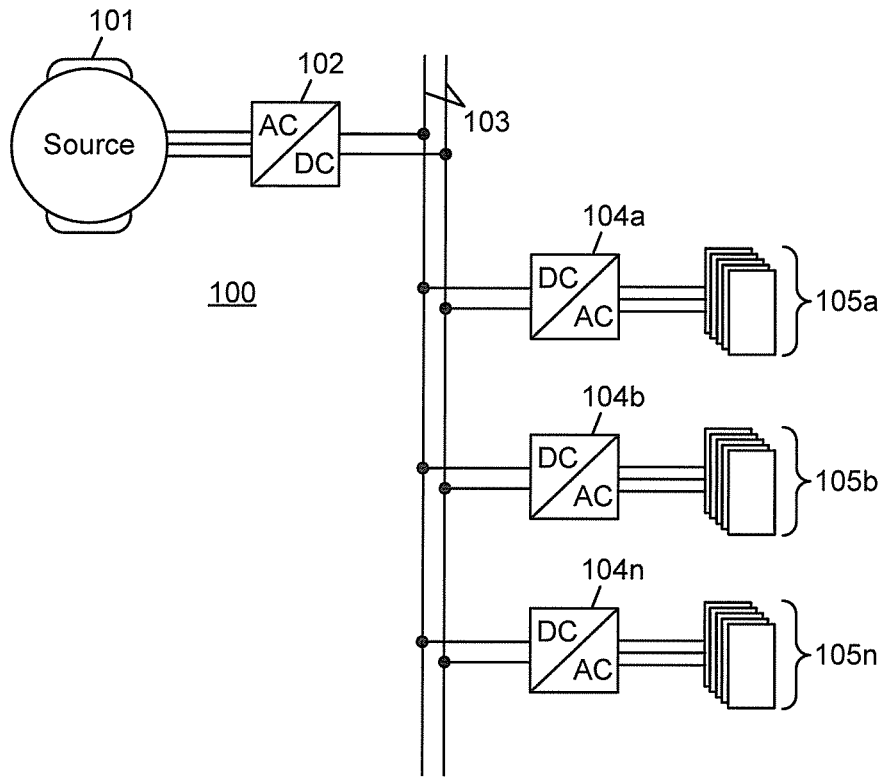
FIG. 1 is a high level diagram of a high voltage direct current (DC) electric power system in which power transmission uses a voltage regulated bus.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

To address issues including those identified above, the present disclosure introduces parallel/series redundant converter groups with active, multi-mode electronic clamps that ensure uninterrupted current flow. An emergency power source and the emergency clamp ensure continuous communication and control even in the event of a massive equipment failure. Furthermore, the solution presented includes a control algorithm for operating series/parallel converter groups as well as a multi-mode control algorithm for the active clamp: 1. Activated clamp forms a short circuit 2. Activated clamp regulates voltage at pre-set value (shunt regulator) 3. Activated clamp operates as a programmable current sink.

The present disclosure describes a robust, current-fed power system architecture with parallel/series redundant converter groups and active clamps that ensure uninterrupted current flow. A parallel-redundant connected converter group with an adaptive clamp and series-redundant connected converter groups are employed. Two or more groups of parallel-redundant converters connected in series form a series-redundant group, employed with an active clamp and emergency power source with an emergency clamp, In operation, the robust current-fed power system utilizes a control algorithm for the series/parallel groups to provide adaptive control with multi-mode operation for the active clamp, so that the activated clamp forms a short circuit and regulates voltage at pre-set value (shunt regulator) by operating as a programmable current sink. On-line diagnostics and prognostics allow for full power range.

Figure 1A:
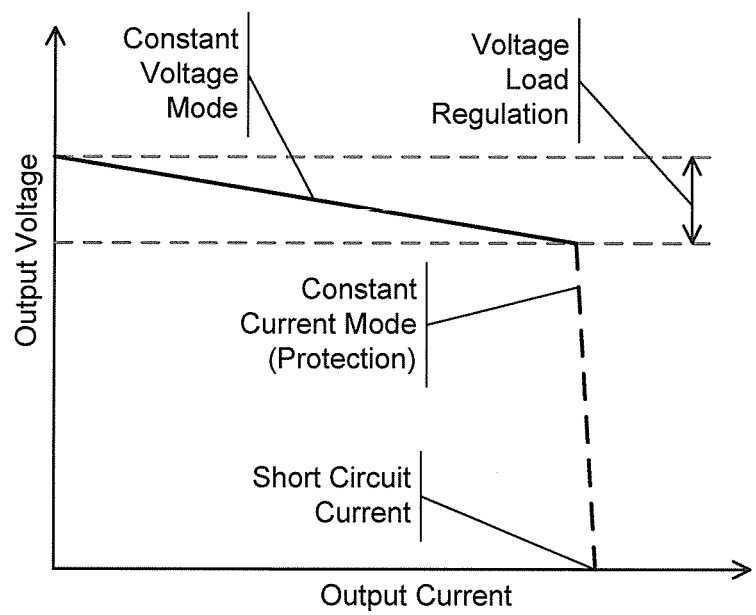
FIG. 1A illustrates typical voltage-current characteristics of the power system of FIG. 1.

FIG. 1 is a high level diagram of a high voltage direct current (DC) electric power system in which power transmission uses a voltage regulated bus, and FIG. 1A illustrates typical voltage-current characteristics of the power system of FIG. 1. The power system 100 employs an alternating current (AC) power source 101 coupled to an AC/DC converter 102. The output of converter 102 is coupled to a voltage regulated bus 103 on which high voltage DC (HVDC) power transmission occurs. Up to n (where n is a positive integer) converter/load groups may be connected to the bus 103, with three DC/AC converters 104a, 104b and 104n and the respective loads 105a, 105b and 105n shown in FIG. 1. Every converter 104a, 104b and 104n operates from nearly the full bus voltage on bus 103, which for long-distance transmission will normally be a high voltage in the range of hundreds of kilovolts (kV). The electric power transmission system 100 will typically operate in voltage mode—that is, the generators regulate their output to maintain constant voltage. To improve voltage load regulation, the system 100 should minimize the voltage drop in the conductors of bus 103 (voltage load regulation), and all loads are effectively connected in parallel to the common bus 103.

Figure 2:
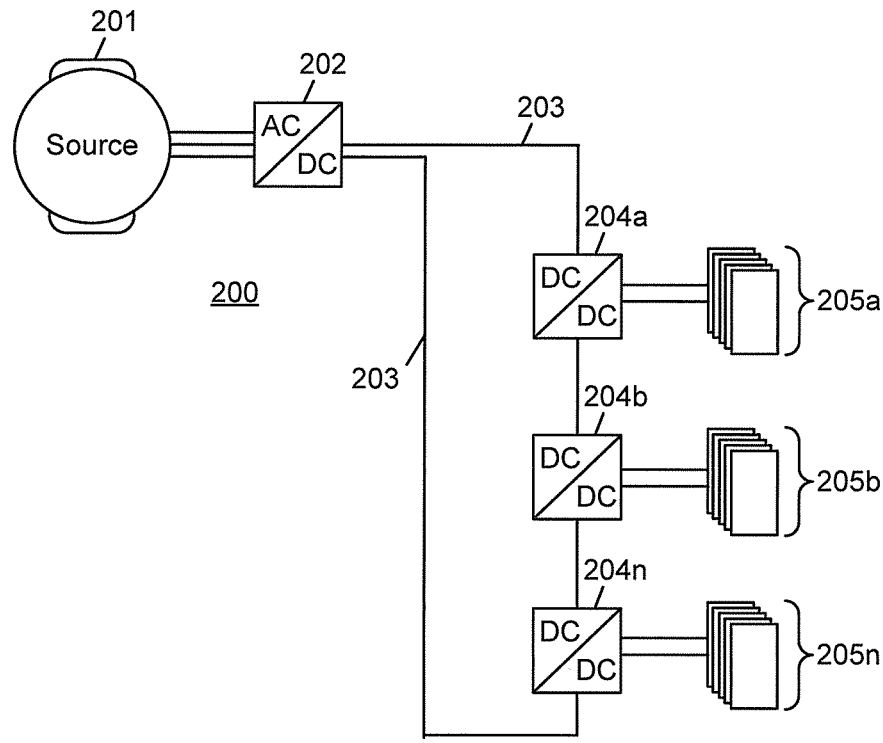
FIG. 2 is a high level diagram of a current-fed medium voltage direct current electric power system in which power transmission uses a current regulated bus.
Figure 2A:
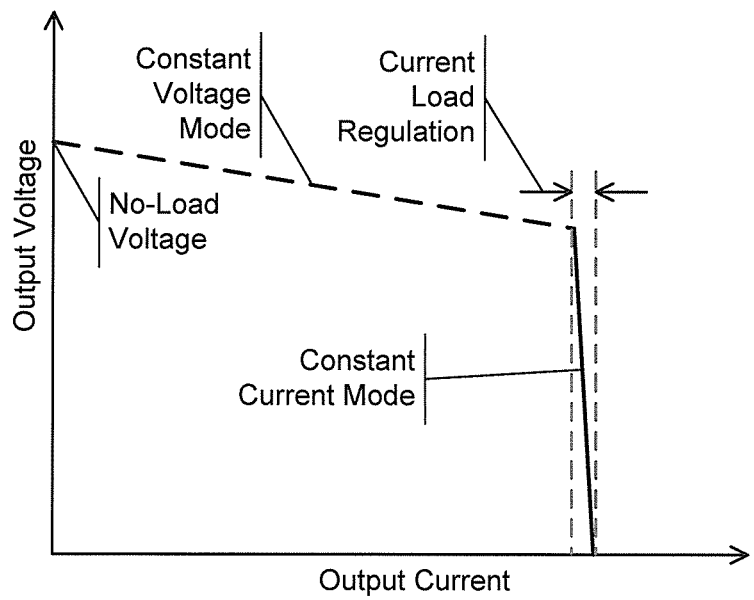
FIG. 2A illustrates typical voltage-current characteristics of the power system of FIG. 2.

FIG. 2 is a high level diagram of a current-fed medium voltage DC electric power system in which power transmission uses a current regulated bus, and FIG. 2A illustrates typical voltage-current characteristics of the power system of FIG. 2. The power system 200 employs an AC power source 201 coupled to an AC/DC converter 202. The output of converter 202 is coupled to a current regulated bus 203 on which medium voltage DC (MVDC) power transmission occurs. Up to n (where n is again a positive integer) converter/load groups may be connected in series to the bus 203, with three DC/DC converters 204a, 204b and 204n and the respective loads 205a, 205b and 205n shown connected in series along the bus 103 in FIG. 2. For some applications (such as undersea equipment), the power converters 204a, 204b and 204n form an integral part of the cable for bus 103, and are assembled with the cable on a reel. The power converters 204a, 204b and 204n operate in the range of tens to hundreds of kilohertz (kHz) to maintain compact size. The common bus voltage on bus 103 is divided between the multiple converters 204a, 204b and 204n. With the arrangement shown in FIG. 2, using hundreds of kilovolts becomes impractical. The use of medium voltages (in the range of kilovolts) leads to a much higher voltage drop regulation for long distance transmission. To minimize the effects of voltage drop on the converters' input voltages, all loads are connected in series.

Figure 3A:
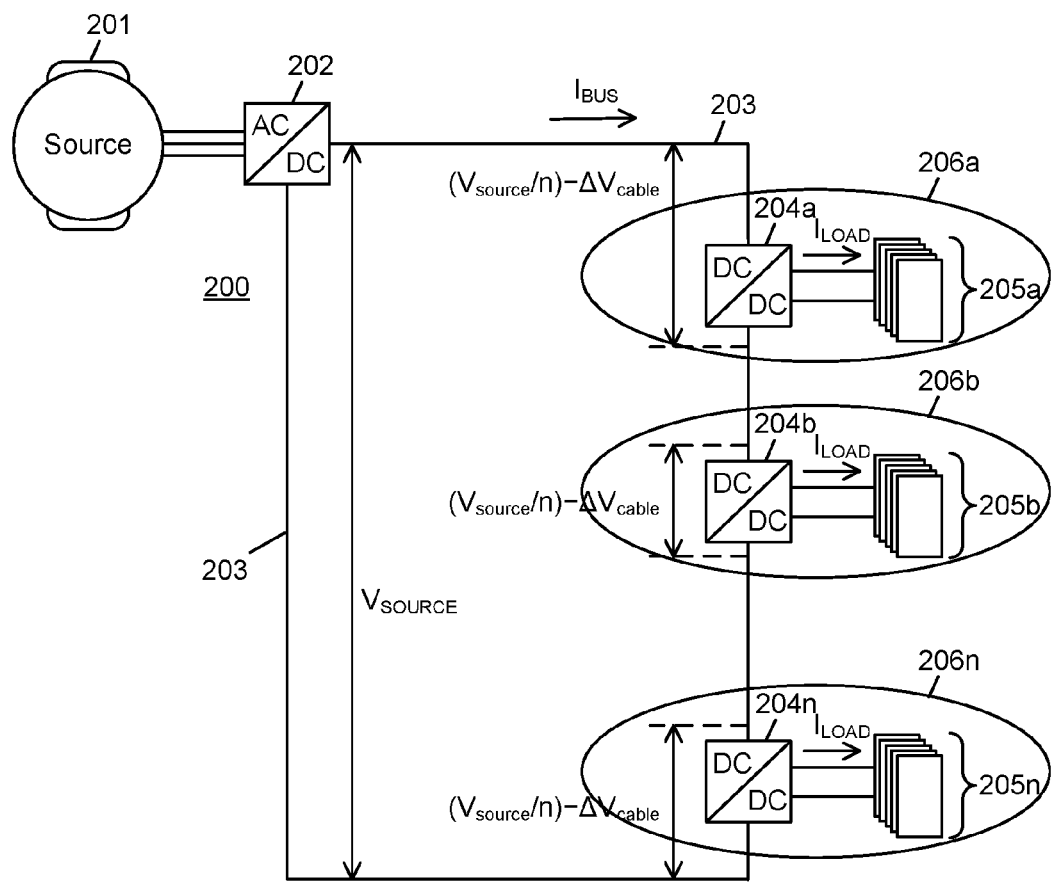
FIGS. 3A and 3B are comparative diagrams illustrating the challenges of current-fed power distribution.
Figure 3B:
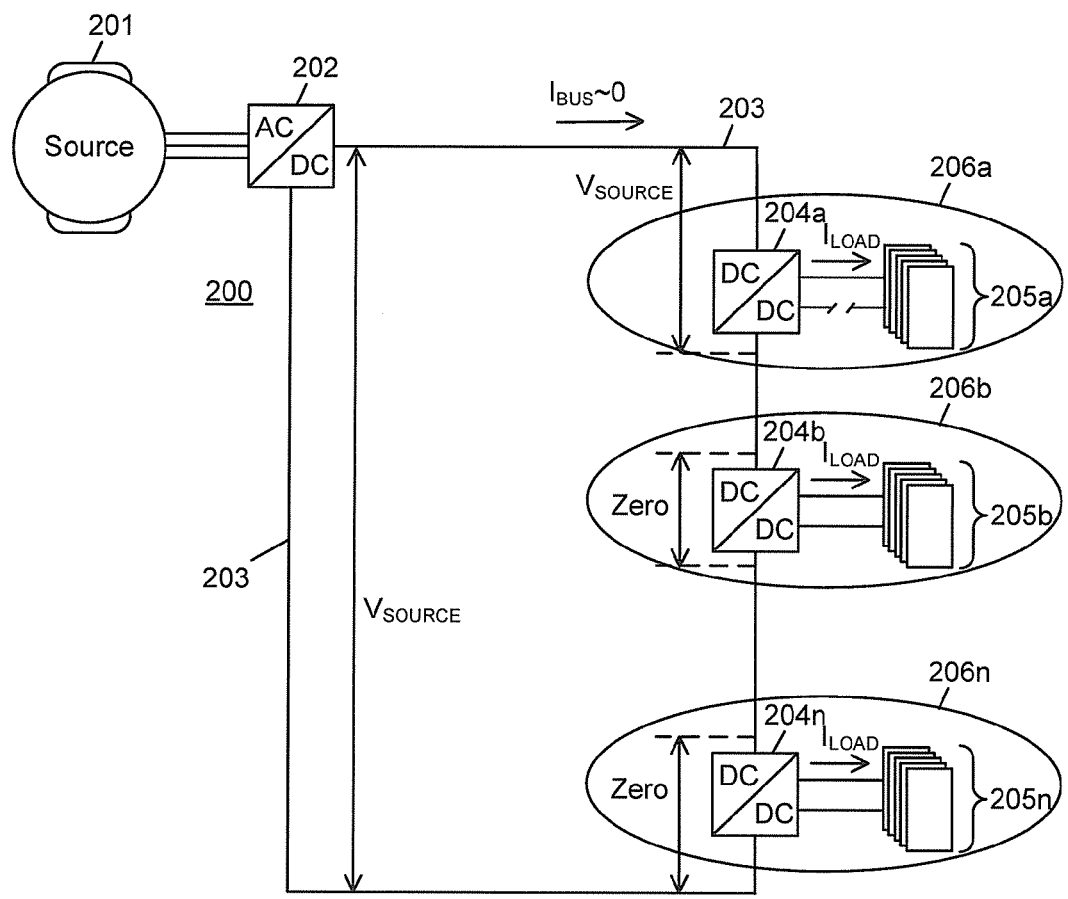

FIGS. 3A and 3B are comparative diagrams illustrating the challenges of current-fed power distribution. The power system 200 of FIG. 2 is employed, with the DC/DC converters 204a, 204b and 204n and the respectively associated load(s) 205a, 205b and 205n logically treated in associated pairs as each part of a respective converter/load group 206a, 206b and 206n. In FIG. 3A, the power system is not experiencing any faults and operates normally. As a result, the source voltage VSOURCE (after reduction based upon the voltage drop due to the cable of bus 203) is approximately equally divided across each of the n converters 204a, 204b and 204n. That is, if equal loads 205a, 205b and 205n are fed by identical converters 204a, 204b and 204n, the input voltage (source voltage VSOURCE) is equally divided between all converters, and converters located near the source have the same input voltage as converters located thousands of miles away from the source—the desired result for this power distribution system.

Figure 4A:
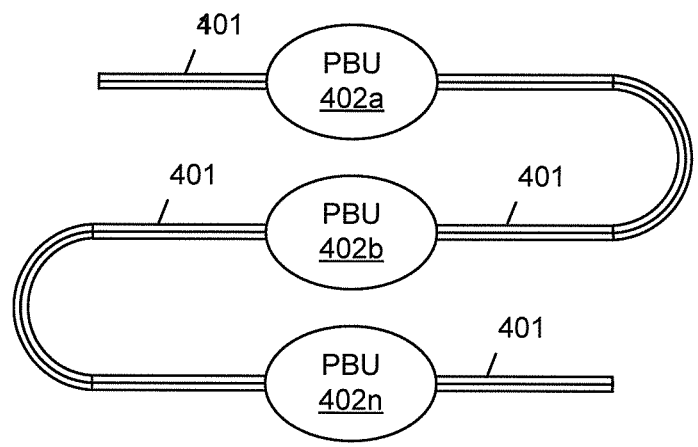
FIGS. 4A, 4B and 4C collectively illustrate a power system based on a current source in accordance with one embodiment of the present disclosure.

Unlike voltage-fed power distribution, current-fed power systems tolerate an indefinite load short circuit but cannot sustain an open circuit at either the source or load. Disconnecting the load or disabling a converter in a way that interrupts current flow from the converter causes an overvoltage at the input terminals of that converter. In FIG. 3B (still assuming equal loads), the return between load(s) 205a and DC/DC converter 204a fails in an open circuit state. Therefore, the overvoltage across the terminals of DC/DC converter 204a (with the failed return from load(s) 205a) is nearly equal to the full source voltage $V_{SOURCE}$, and the converters 204b, 204n feeding all other loads 205b, 205n have nearly zero voltage across their input terminals FIGS. 4A, 4B and 4C collectively illustrate a power system based on a current source in accordance with one embodiment of the present disclosure. FIG. 4A illustrates the physical structure of the power distribution portion of a power system based on a current source in accordance with an embodiment of the present disclosure. Unlike land-based power systems that can feature multiple loads connected in parallel to the source, the power system 100 of the present disclosure is suitable for use as an underwater system, which requires series connections of the feeding cable and loads and can extend thousands of miles with a large number of loads. Under those circumstances, any load failure that interrupts the current in the feeding cable disables the whole power system. In the power system, a trunk or backbone cable for a series bus 401 connects a plurality of power branching units (PBUs) 402a, 402b and 402n that may each be connected to one or more load(s). The power branching units 402a, 402b and 402n, which may be formed as an integral part of the cable for bus 401, each include load power converters arranged in parallel-redundant groups, so that if one converter fails, the current will bypass that failed converter through the remaining unit. An adaptively-controlled active clamp is used to ensure uninterrupted current flow and to regulate the power converter environment in the event of multiple failures.

Figure 4B:
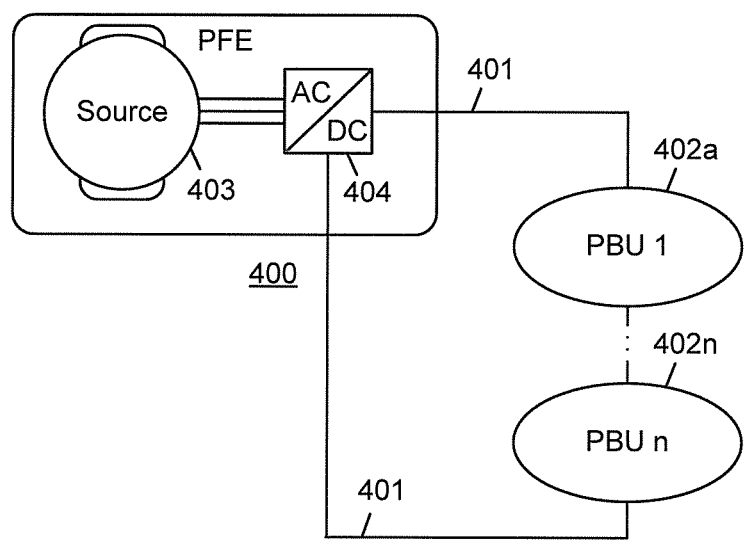

FIG. 4B is a high level diagram illustrating the electrical connections in a power system based on a current source in accordance with one embodiment of the present disclosure. In the power system 400, power feed equipment (PFE) including a power source 403 coupled to an AC/DC converter 404 feeds the bus 401 of FIG. 4A at an output of converter 404. Power branching units 402a through 402n are connected to the power bus 401 at intervals (regularly or sporadically spaced) along the cable for bus 401, which also connects to converter 404 at a return connection. Each power branching unit 402a through 402n receives and outputs the regulated current carried on the bus 401 within the connecting cable.

Figure 4C:
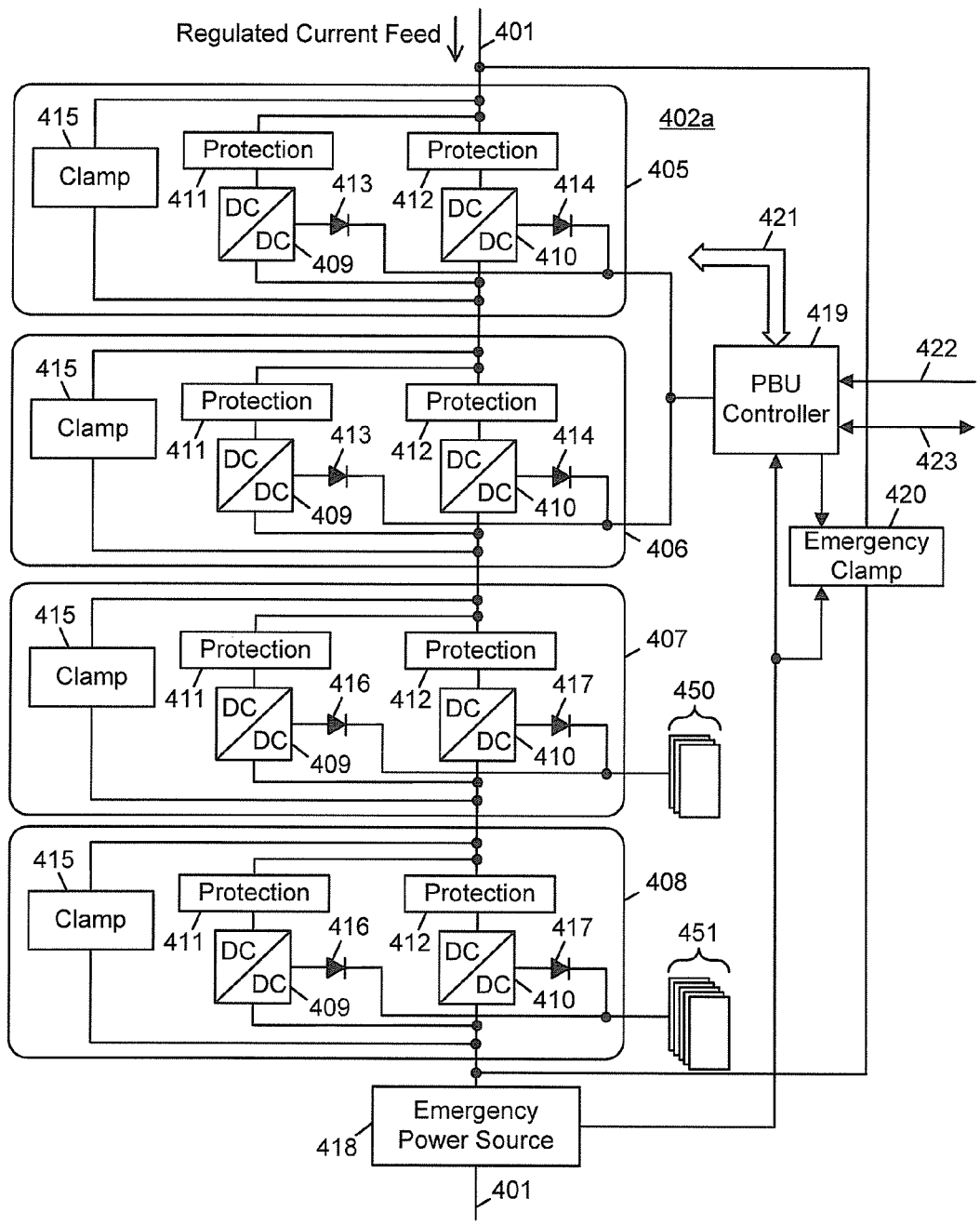

FIG. 4C is a diagram of the architecture of a power branching unit within the power system based on a current source that is depicted in FIGS. 4A and 4B. The power branching unit 402a is one of n power branching units, each having substantially the same architecture as shown in FIG. 4C, coupled in series within a single closed loop formed by power bus 401 and each receiving and outputting the regulated current. The power branching unit 402a, like other power branching units 402b through 402n, receives a regulated current feed on the power bus 401 from the AC/DC converter 404 shown in FIG. 4B.

In the architecture of the present disclosure, two or more DC/DC converters are arranged in parallel-redundant groups 405, 406, 407 and 408 connected in series and each receiving and outputting the regulated current. In the example shown, each parallel-redundant group 405, 406, 407 and 408 includes two DC/DC converters 409 and 410. DC/DC converters 409 and 410 are connected in parallel with each other within the current path for the regulated current through the respective parallel-redundant converter group. All converters 409 and 410 have a series-connected protection device 411, 412 (e.g. fuses) connected at an input to the respective converter. All converters 409 and 410 also have a device 413, 414, 416 or 417 (e.g., forward-biased diode or transistor-based switch) connected at an output of the respective converter. For two of the parallel-redundant groups 405 and 406, the devices 413 and 414 are biasing devices that connect the respective converter output to a control signal line, such that the respective parallel-redundant groups 405 and 406 are bias parallel-redundant converter groups; for the remaining two parallel-redundant groups 407 and 408, the devices 413 and 414 are connected respectively to loads 450 and 451, such that the respective parallel-redundant groups 407 and 408 are load parallel-redundant converter groups. In the example shown, loads 450 are lighter loads and loads 451 are heavier loads, although the loads could be substantially identical. In some embodiments, the loads 450 and 451 are located within the housing for the respective power branching unit 402a, while in other embodiments the housing includes one or more connections for external loads.

Within each parallel-redundant group 405, 406, 407 and 408, either (a) one converter 409 or 410 is active at any given time (while the other converter is disabled), or (b) all converters 409 and 410 share power. Each parallel-redundant group 405, 406, 407 and 408 has a parallel-connected active clamp 415 connected in parallel with both converters 409 and 410 within the current path for the regulated current through the respective parallel-redundant converter group. The protective clamps 415 have multi-mode operation, selectively forming a short circuit as needed, regulating the voltage across the converters 409 and 410 at a preset value (i.e., forming a shunt regulator), and functioning as a programmable current sink.

As illustrated in FIG. 4C, the power branching unit 402a also includes an emergency power source 418 connected in series with the parallel-redundant groups 405, 406, 407 and 408 within the power bus 401, and connected to a PBU controller 419 and an emergency clamp 420 connected in parallel with the parallel-redundant groups 405, 406, 407 and 408. The PBU controller 419 is connected to the emergency clamp 420 and, in the event of a massive failure, activates the emergency clamp 420, shunting the converters of the power branching unit 402a, and continues operation using the emergency power source 418 or energy storage (not shown). In addition, the PBU controller 419 provides online diagnostics and prognostics via a set of signals on an interface 421 to the converters 409 and 410 and loads 450 and 451, and is connected to the bias devices 413 and 414 as part of controlling the bias parallel-redundant groups 405 and 406. The PBU controller 419 includes signal inputs 422 for receiving external control signals and bidirectional communications connections 423 for external communications.

Figure 5:
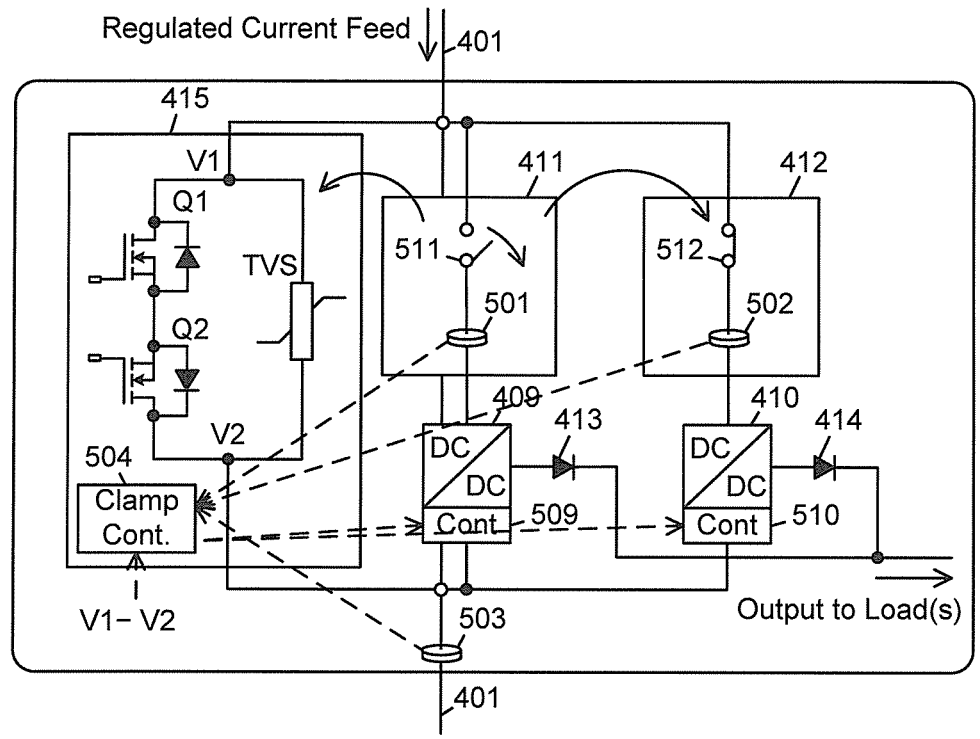
FIG. 5 is a diagram illustrating a parallel redundant mode of operation of a parallel-redundant converter group feeding a load within a power system in accordance with one embodiment of the present disclosure.
Figure 5A:
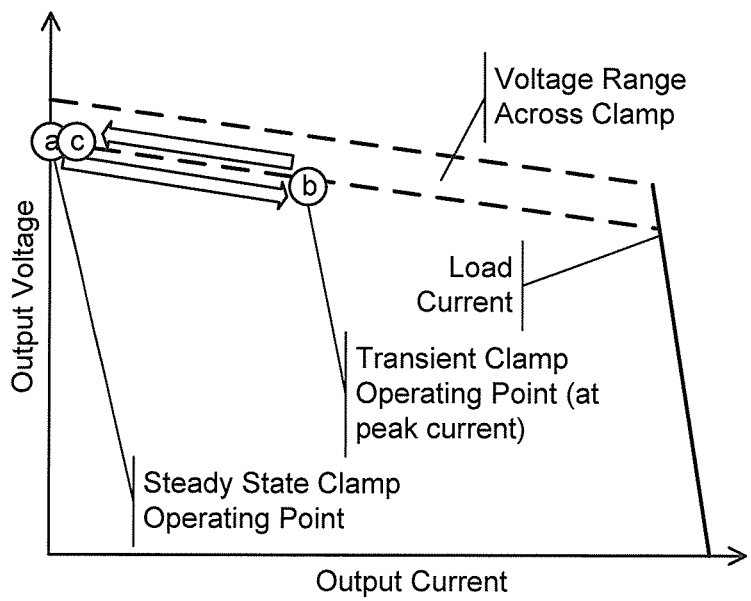
FIG. 5A illustrates voltage-current characteristics of the power system during the operation illustrated by FIG. 5.

FIG. 5 is a diagram illustrating a parallel redundant mode of operation of a parallel-redundant converter group feeding a load within a power system in accordance with one embodiment of the present disclosure, and FIG. 5A illustrates voltage-current characteristics of the clamp 415 during the operation illustrated by FIG. 5. FIG. 5 depicts additional details of the parallel-redundant groups 407 and 408 from FIG. 4C, including: the converter controllers 509 and 510 for DC/DC converters 409 and 410, respectively; the series-connected switching fuse 511 and current sense device 501 within protection device 411 and the series-connected switching fuse 512 and current sense device 502 within protection device 412; the current sense device 503 connected on the power bus 401 after the converters 409 and 410; and the structure of the active clamp 415, which includes a transient voltage suppressor TVS connected between nodes V1 and V2 in parallel with series-connected field effect transistors (FETs) Q1 and Q2, and a clamp controller 504. The clamp controller 504 receives signals from current sense devices 501, 502 and 503 and a sense input corresponding to the difference between the voltages at V1 and V2, and outputs signals to the converter controllers 509 and 510. Additional sensors may be used if needed.

In the parallel redundant mode of operation, under normal conditions (point "a" in FIG. 5A) the two converters 409 and 410 share the load power. If the converters 409 and 410 do not have an "internal" (to the converter pair) means to ensure current sharing (e.g., based on the slope of their output characteristics), the active clamp 415 will enforce current sharing by applying signals to their controllers 509 and 510. The protection devices 411 and 412 monitor input currents for both converters 409 and 410 and send the measured data to the controller 504 of the claim 415, which compares the sum of such input currents to the total current and monitors the voltage across the parallel-redundant group. If one converter 409 fails, presenting a short circuit to the power bus 401 within the backbone cable, the protection device 411 for that converter 409 disconnects the converter 409 from the system (as shown by the curved arrow indicating opening of the switching fuse 511 from a previously closed state). The remaining converter 410 increases its share of the power to 100% (indicated by the curved arrow from protection device 411 to protection device 412 in FIG. 5). During the transition (point "b" in FIG. 5A), the active clamp 415 temporarily acts as a current sink (indicated by the curved arrow from protection device 411 to clamp 415 in FIG. 5), keeping the total current through the parallel redundant group close to its steady state. The clamp 415 absorbs the transient current while acting as a current sink temporarily— that is, until the other converter 410 within the respective parallel-redundant group adjusts to operation with all of the load power from the regulated current. Notably, while the description above concentrates on the short circuit failure of one converter, the description is equally application to other failure modes, including an open circuit failure and a failure to conduct the allocated share of the load current.

Figure 6:
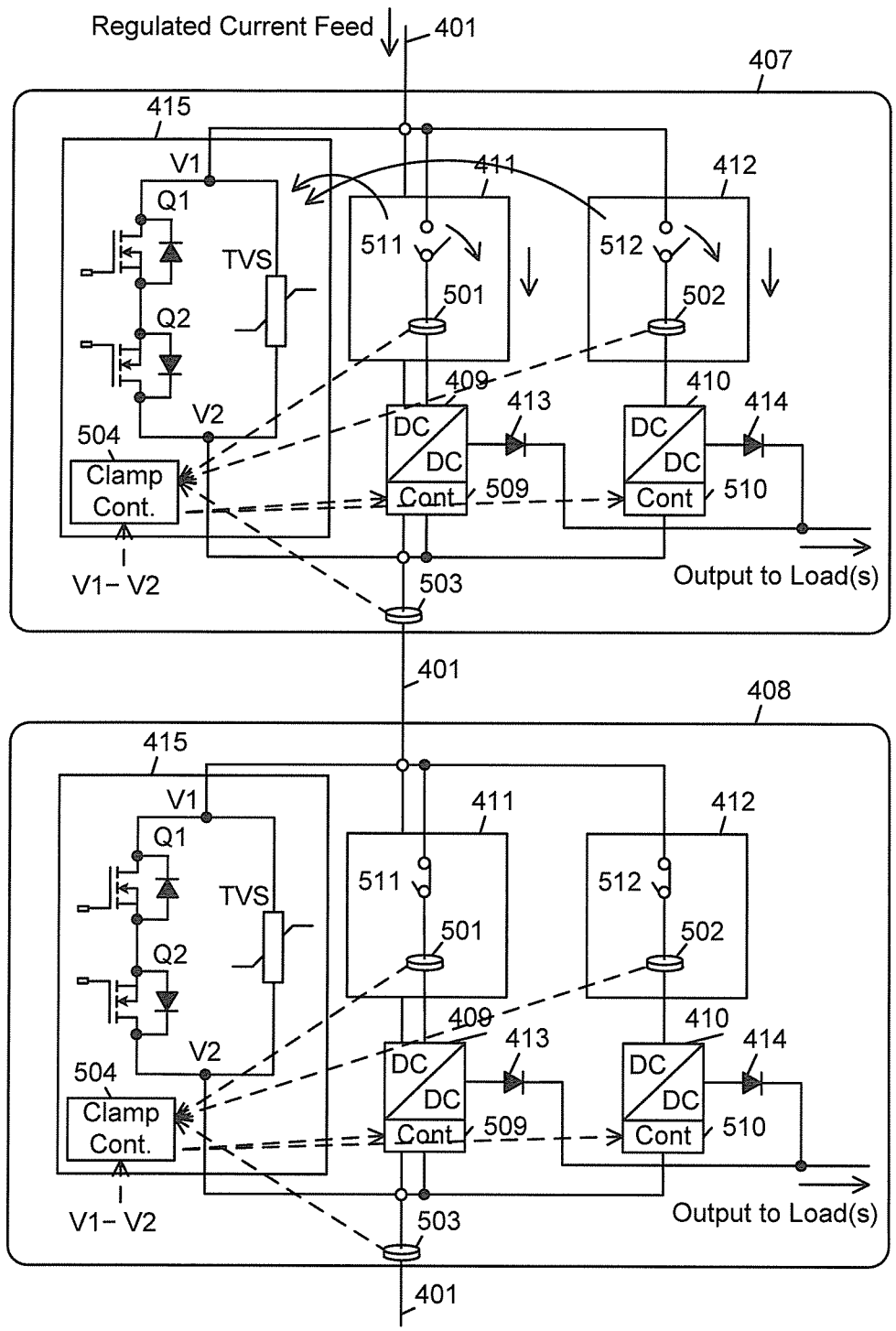
FIG. 6 is a diagram illustrating a series redundant mode of operation of a pair of parallel-redundant converter groups feeding loads within a power system in accordance with one embodiment of the present disclosure.
Figure 6A:
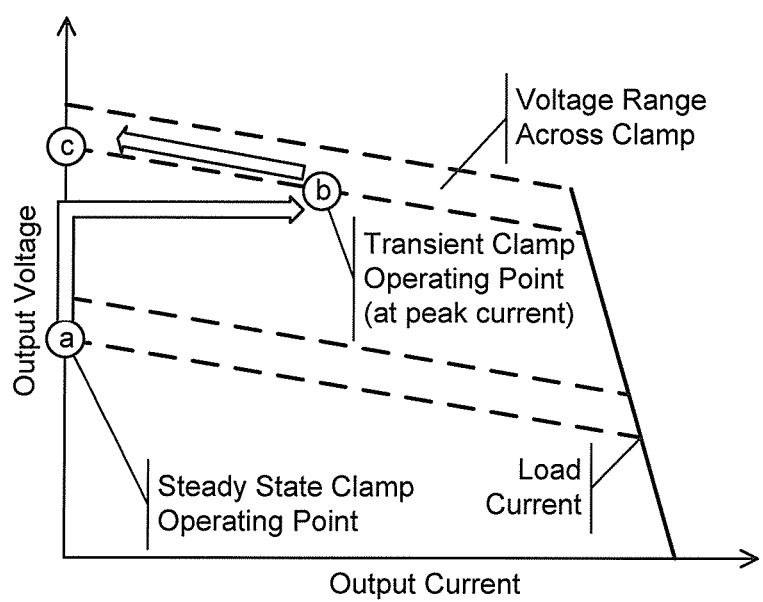
FIG. 6A illustrates voltage-current characteristics of the power system during the operation illustrated by FIG. 6.

FIG. 6 is a diagram illustrating a series redundant mode of operation of a pair of parallel-redundant converter groups feeding loads within a power system in accordance with one embodiment of the present disclosure, and FIG. 6A illustrates voltage-current characteristics of the clamp 415 during the operation illustrated by FIG. 6. The parallel-redundant groups 407 and 408 from FIG. 4C are shown in FIG. 6, and FIG. 6A illustrates the operating region relating to the clamp 415 in parallel-redundant converter group 408. The series-connected parallel-redundant converter groups 407 and 408 inherently share power in that their input current is the same and the output voltages are for input-series, output-parallel (ISOP) connection. If both converters 409 and 410 within parallel-redundant converter group 407 fail (shown by the curved arrows indicating opening of the switching fuses 511 and 512 in converter group 407, from previously closed states, and the curved arrows from protection devices 411 and 412 to clamp 415 in FIG. 6), protection devices 411 and 412 will disconnect them from the system. Clamp 415 in converter group 407 will short the failed converters 409 and 410 in that converter group 407 and conduct full current. The voltage across the converters 409 and 410 in converter group 408 will double, reflecting their increased share of power. During the transition, clamp 415 in converter group 408 will operate as a shunt regulator limiting the voltage across the converters 409 and 410 of converter group 408 close to its steady state value. The clamp voltage regulation point is adaptively controller by the power branching unit according to the operating voltage across each converter group 407 and 408. When both converter groups 407 and 408 are working, the clamp regulation voltage in each equals 50% of the load power divided by the feed current. When, for example, the converters in converter group 407 fail, the clamp regulation voltage for the other converter group 408 equals 100% of the load power divided by the feed current.

Figure 7:
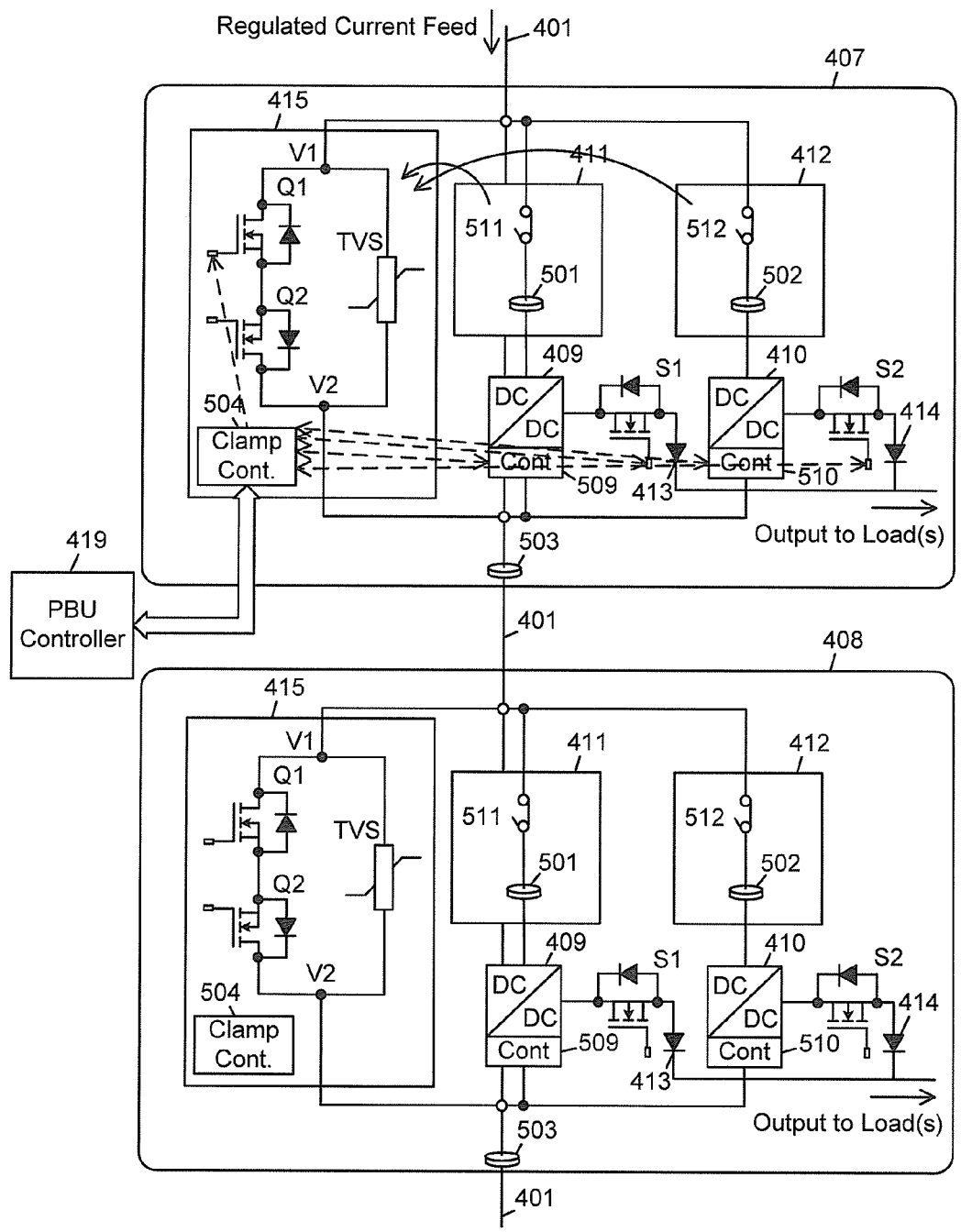
FIG. 7 is a diagram illustrating an online diagnostics and prognostics mode of operation of a pair of parallel-redundant converter groups feeding loads within a power system in accordance with one embodiment of the present disclosure.

FIG. 7 is a diagram illustrating an online diagnostics and prognostics mode of operation of a pair of parallel-redundant converter groups feeding loads within a power system in accordance with one embodiment of the present disclosure. Signals not relevant to this mode of operation are not shown in FIG. 7 for clarity. The clamp controller 504 of converter group 407 is connected to exchange bidirectional signals with the controllers 509 and 510 of DC/DC converters 409 and 410 within that converter group, and with the control inputs to switching devices S1 and S2 connected to the outputs of those converters 409 and 410, respectively. The clamp controller 504 of converter group 407 is also connected to transmit signals to the control input of FET Q1 within active clamp 415. In this mode, the PBU controller 419 commands the active clamp 415 of converter group 407 (through clamp controller 504) to disconnect converters 409 and 410 within converter group 407 from the load. Fully controllable switching devices S1 and S2 are used to selectively connect and disconnect the converters 409 and 410 to and from the load. At the same time, the converters 409 and 410 of converter group 408 provide full load current.

During online diagnostics and prognostics, the PBU controller 419 commands the active clamp 415 in converter group 407 to run converters 409 and 410 in converter group 407 through a test profile (e.g., supplying test currents ranging from a short circuit to zero current). The clamp 415 within converter group 407 operates as a programmable current sink during such tests. The active clamp 415 in converter group 407 monitors parameters of the converters 409 and 410 in converter group 407 (e.g., efficiency, case temperature rise, etc.) and reports the parameters to the PBU controller 419.

Figure 8:
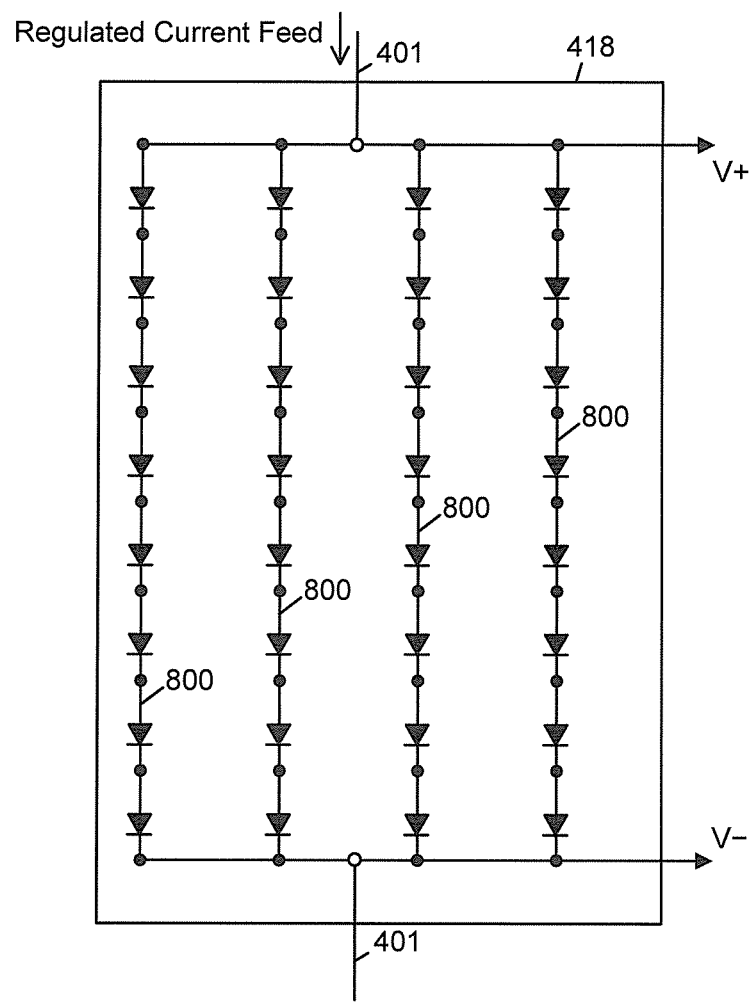
FIG. 8 is illustrates one embodiment of an emergency power source for use within a power system in accordance with one embodiment of the present disclosure.

FIG. 8 is illustrates one embodiment of an emergency power source for use within a power system in accordance with one embodiment of the present disclosure. FIG. 8 illustrates one embodiment for emergency power source 418 illustrated in FIG. 4C for power branching unit 402a. In the event of a massive failure of the power branching unit 402a, the PBU controller 419 activates the emergency clamp 420 shunting the all converter groups 405, 406, 407 and 408 within the power branching unit 402a. A part of the controller 419 continues operation using an emergency power source 418. Conventional uninterruptable power supplies (UPSs) do not provide an adequate solution for robust, current-fed systems since a UPS connected in series with the backbone cable presents a single point of potential failure and the complexity of a UPS is incompatible with long-term unserviced operation. In the present disclosure, an array of highly reliable series- and parallel-connected components such as resistors, Zener diodes, and/or junction diodes is employed to generate the emergency voltage. In the example shown in FIG. 8, four parallel strings 800 each having eight series-connected diodes is employed for the emergency power source 418, to generate emergency voltage difference V+ to V−. One ampere (A) flowing through such an array of components will provide a 5-6 V voltage source. This solution provides for graceful degradation since multiple failures do not disable the emergency source. Each string 800 should be rated for full source current.

The present disclosure describes a robust current-fed power system architecture with parallel/series redundant converter groups and active clamps that ensure uninterrupted current flow. The power branching units of the system include parallel-redundant connected converter groups with an adaptive clamp and series-redundant connected converter groups, where two or more groups of parallel-redundant converters are connected in series form each series-redundant group. The power branching units of the system also include an active clamp and an emergency power source and emergency clamp.

In operation, the power branching unit of the robust current-fed power system employs a control algorithm for series/parallel converter groups and adaptive control with multi-mode operation for the active clamp, which can selectively form a short circuit, regulate voltage at a preset value (acting as a shunt regulator), and operate a programmable current sink. The power branching unit of the robust current-fed power system also provides online diagnostics and prognostics for the full power range, as well as an emergency control algorithm that maintains communication capability in the event of a massive failure of the power branching unit.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A power branching unit, comprising:
an input at which a regulated current is received;
an output at which the regulated current is output; and
a plurality of parallel-redundant converter groups connected in series with each other within a current path for the regulated current between the input and the output, each parallel-redundant converter group configured to selectively receive the regulated current and each parallel-redundant converter group comprising:
two or more direct current (DC)/DC converters connected in parallel with each other within the current path, each of the DC/DC converters configured to selectively receive at least a portion of the regulated current and each of the DC/DC converters connected in series with a protection device within the current path, wherein each protection device is configured to selectively disconnect a respective series-connected one of the DC/DC converters from the current path when the respective series-connected DC/DC converter fails in a condition presenting a short circuit or an open circuit to the current path, and wherein the parallel-redundant converter group is configured to cause one of the DC/DC converters to receive more of the regulated current when another one of the DC/DC converters fails in the condition presenting the short circuit or the open circuit to the current path; and an active clamp connected in parallel with all of the DC/DC converters within the current path, the active clamp configured:

to temporarily sink a portion of the regulated current when the another one of the DC/DC converters fails in the condition presenting the short circuit or the open circuit to the current path, and to selectively shunt the regulated current around all of the DC/DC converters when all of the DC/DC converters fail in the condition presenting the short circuit or the open circuit to the current path.

2. The power branching unit according to claim 1, wherein the plurality of parallel-redundant converter groups includes two bias parallel-redundant converter groups and two load parallel-redundant converter groups.

3. The power branching unit according to claim 1, further comprising:

an emergency clamp connected in parallel within the current path with all of the parallel-redundant converter groups; and a power branching unit controller communicatively coupled to the plurality of parallel-redundant converter groups and configured to selectively activate the emergency clamp to shunt the regulated current around the parallel-redundant converter groups.

4. The power branching unit according to claim 3, further comprising:

an emergency power source connected in series within the current path with all of the parallel-redundant converter groups, wherein the emergency power source is configured to produce a voltage drop within the current path when the emergency clamp shunts the regulated current around the parallel-redundant converter groups.

5. The power branching unit according to claim 1, wherein, for each parallel-redundant converter group:

each protection device includes a current sensor configured to sense current through the respective series-connected DC/DC converter, each DC/DC converter includes a converter controller configured to selectively adapt operation of the respective DC/DC converter, and the active clamp includes a clamp controller configured to: receive signals indicating a voltage across the parallel-redundant converter group and a current sensed by one of the protection devices through the respective series-connected DC/DC converter, and transmit signals to the converter controllers to cause the one of the DC/DC converters to receive more of the regulated current when the another one of the DC/DC converters within the parallel-redundant converter group fails in the condition presenting the short circuit or the open circuit to the current path.

6. The power branching unit according to claim 5, further comprising:

a power branching unit controller communicatively coupled to the plurality of parallel-redundant converter groups and configured to cause the DC/DC converters within one of the parallel-redundant converter groups to increase a voltage across those DC/DC converters when all DC/DC converters within another one of the parallel-redundant converter groups fail in the condition presenting the short circuit or the open circuit to the current path.

7. An apparatus comprising a plurality of the power branching units of claim 1, the apparatus further comprising:

a power source; and an alternating current (AC)/DC converter connected to the power source and to a cable, the AC/DC converter configured to generate the regulated current, wherein the power branching units are connected in series with each other within a current path for the regulated current, the respective input of each power branching unit and the respective output of each power branching unit both connected to a power bus within the cable.

8. A method, comprising:

receiving a regulated current at an input of a power branching unit;

outputting the regulated current from an output of the power branching unit;

passing the regulated current through a plurality of parallel-redundant converter groups connected in series with each other within a current path for the regulated current between the input and the output, each parallel-redundant converter group configured to selectively receive the regulated current and each parallel-redundant converter group comprising:

two or more direct current (DC)/DC converters connected in parallel with each other within the current path, each of the DC/DC converters configured to selectively receive at least a portion of the regulated current and each of the DC/DC converters connected in series with a protection device within the current path; and an active clamp connected in parallel with all of the DC/DC converters within the current path;

within one of the parallel-redundant converter groups, causing one of the DC/DC converters within the one parallel-redundant converter group to receive more of the regulated current when another one of the DC/DC converters within the one parallel-redundant converter group fails in a condition presenting a short circuit or an open circuit to the current path and using one of the protection devices to selectively disconnect the another one of the DC/DC converters series-connected to the one protection device from the current path when the another one of the DC/DC converters fails in the condition presenting the short circuit or the open circuit to the current path;

using the active clamp of the one parallel-redundant converter group, temporarily sinking a portion of the regulated current when the another one of the DC/DC converters fails in the condition presenting the short circuit or the open circuit to the current path; and using the active clamp of the one parallel-redundant converter group, selectively shunting the regulated current around all of the DC/DC converters within the one parallel-redundant converter group when all of the DC/DC converters within the one parallel-redundant converter group fail in the condition presenting the short circuit or the open circuit to the current path.

9. The method according to claim 8, wherein the plurality of parallel-redundant converter groups includes two bias parallel-redundant converter groups and two load parallel-redundant converter groups.

10. The method according to claim 8, wherein the power branching unit further comprises:
an emergency clamp connected in parallel within the current path with all of the parallel-redundant converter groups; and
a power branching unit controller communicatively coupled to the plurality of parallel-redundant converter groups and configured to selectively activate the emergency clamp to shunt the regulated current around the parallel-redundant converter groups.

11. The method according to claim 10, wherein the power branching unit further comprises an emergency power source connected in series within the current path with all of the parallel-redundant converter groups, the method further comprising:
using the emergency power source, producing a voltage drop within the current path when the emergency clamp shunts the regulated current around the parallel-redundant converter groups.

12. The method according to claim 8, wherein, for each parallel-redundant converter group:
each protection device includes a current sensor configured to sense current through the respective series-connected DC/DC converter,
each DC/DC converter includes a converter controller configured to selectively adapt operation of the respective DC/DC converter, and
the active clamp includes a clamp controller configured to: receive signals indicating a voltage across the parallel-redundant converter group and a current sensed by one of the protection devices through the respective series-connected DC/DC converter, and transmit signals to the converter controllers to cause the one of the DC/DC converters to receive more of the regulated current when the another one of the DC/DC converters within the parallel-redundant converter group fails in the condition presenting the short circuit or the open circuit to the current path.

13. The method according to claim 12, wherein the power branching unit further comprises a power branching unit controller communicatively coupled to the plurality of parallel-redundant converter groups, the method further comprising:
using the power branching unit controller, causing the DC/DC converters within one of the parallel-redundant converter groups to operate with increased voltage across those DC/DC converters when all DC/DC converters within another one of the parallel-redundant converter groups fail in the condition presenting the short circuit or the open circuit to the current path.

14. The method according to claim 8, wherein the power branching unit is one of a plurality of the power branching units connected by a cable to an alternating current (AC)/DC converter connected to a power source and configured to generate the regulated current, wherein the power branching units are connected in series with each other within a current path for the regulated current, the respective input of each power branching unit and the respective output of each power branching unit both connected to a power bus within the cable.

15. A power branching unit, comprising:
an input at which a regulated current is received;
an output at which the regulated current is output;
a first parallel-redundant converter group connected to the input and configured to selectively receive the regulated current, the first parallel-redundant converter group including:
first and second parallel-connected direct current (DC)/DC converters each configured to selectively receive at least a portion of the regulated current from, respectively, first and second protection devices connected in series with the first and second DC/DC converters, wherein the first and second protection devices are each configured to selectively disconnect the first or second DC/DC converter from receiving any of the regulated current upon failure of the first or second DC/DC converter in a short circuit or open circuit condition, such that one of the first and second DC/DC converters receives more of the regulated current when another of the first and second DC/DC converters fails, and
a first active clamp connected in parallel with the first and second DC/DC converters, the first active clamp configured to temporarily sink a portion of the regulated current when the one of the first and second DC/DC converters fails and to selectively shunt the regulated current around both of the first and second DC/DC converters; and
a second parallel-redundant converter group connected in series with the first parallel converter group and configured to selectively receive the regulated current, the second parallel-redundant converter group including:
third and fourth parallel-connected DC/DC converters each configured to selectively receive at least a portion of the regulated current from, respectively, third and fourth protection devices connected in series with the third and fourth DC/DC converters, wherein the third and fourth protection devices are each configured to selectively disconnect the third or fourth DC/DC converter from receiving any of the regulated current upon failure of the third or fourth DC/DC converter in the short circuit or open circuit condition, such that one of the third and fourth DC/DC converters receives more of the regulated current when another of the third and fourth DC/DC converters fails, and
a second active clamp connected in parallel with the third and fourth DC/DC converters, the second active clamp configured to selectively shunt the regulated current around one of the third and fourth DC/DC converters and to temporarily sink a portion of the regulated current when the one of the third and fourth DC/DC converters fails.

16. The power branching unit according to claim 15, wherein the first and second parallel-redundant converter groups are each connected to a controller.

17. The power branching unit according to claim 15, wherein the first and second parallel-redundant converter groups are each connected to one or more loads.

18. The power branching unit according to claim 15, further comprising:
an emergency clamp connected in parallel with the first and second parallel-redundant converter groups; and
a power branching unit controller communicatively coupled to the first and second parallel-redundant converter groups and configured to selectively activate the emergency clamp to shunt the regulated current around the first and second parallel-redundant converter groups.

19. The power branching unit according to claim 18, further comprising:
- an emergency power source connected in series with the first and second parallel-redundant converter groups, wherein the emergency power source is configured to produce a voltage drop based upon the regulated current when the emergency clamp shunts the regulated current around the first and second parallel-redundant converter groups.

20. The power branching unit according to claim 15, further comprising:
- a power branching unit controller communicatively coupled to the first and second parallel-redundant converter groups and configured to cause one of the first and second DC/DC converters within the first parallel-redundant converter group or one of the third and fourth DC/DC converters within the second parallel-redundant converter group to increase a voltage across the respective DC/DC converter when all DC/DC converters within one of the first and second parallel-redundant converter groups fail.

* * * * *